United States Patent
Hsiao et al.

(10) Patent No.: US 9,058,850 B2
(45) Date of Patent: Jun. 16, 2015

(54) FIXING STRUCTURE OF DATA ACCESS DEVICE AND FIXING CASE

(71) Applicant: LITE-ON TECHNOLOGY CORPORATION, Taipei (TW)

(72) Inventors: Hsu-Chih Hsiao, New Taipei (TW); Shu-Hua Mau, Taoyuan County (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 266 days.

(21) Appl. No.: 13/663,554

(22) Filed: Oct. 30, 2012

(65) Prior Publication Data

US 2014/0119816 A1    May 1, 2014

(51) Int. Cl.
    *G11B 33/12*    (2006.01)

(52) U.S. Cl.
    CPC ........... *G11B 33/128* (2013.01); *Y10T 403/595* (2015.01)

(58) Field of Classification Search
    CPC .... G11B 33/124; G11B 33/128; G11B 33/08; G11B 33/10; G06F 1/187
    USPC .................. 248/633, 618, 27.1, 27.3, 220.21, 248/222.11, 222.12; 361/679.57, 679.33, 361/679.37, 639.35, 679.26, 679.27, 679.3; 439/638; 364/708.1; 312/223.1, 223.2, 312/332.1, 333
    See application file for complete search history.

(56) References Cited

U.S. PATENT DOCUMENTS

| 5,654,873 | A  | * | 8/1997  | Smithson et al. | 361/679.37 |
| 7,523,901 | B2 | * | 4/2009  | Wu et al. | 248/225.21 |
| 7,616,436 | B2 | * | 11/2009 | DeMoss et al. | 361/679.34 |
| 7,684,181 | B2 | * | 3/2010  | Peng et al. | 361/679.33 |
| 7,697,276 | B2 | * | 4/2010  | Peng et al. | 361/679.33 |
| 7,697,278 | B2 | * | 4/2010  | Peng et al. | 361/679.35 |
| 7,701,706 | B2 | * | 4/2010  | Peng et al. | 361/679.37 |
| 7,701,707 | B2 | * | 4/2010  | Peng et al. | 361/679.37 |
| 8,159,816 | B2 | * | 4/2012  | Chen | 361/679.33 |
| 8,226,050 | B2 | * | 7/2012  | Ye et al. | 248/27.3 |
| 8,264,833 | B2 | * | 9/2012  | Fang et al. | 361/679.34 |
| 8,310,827 | B2 | * | 11/2012 | Huang et al. | 361/679.37 |
| 8,416,562 | B2 | * | 4/2013  | Ding | 361/679.33 |
| 8,456,832 | B1 | * | 6/2013  | Brigham et al. | 361/679.35 |
| 8,544,801 | B2 | * | 10/2013 | Ting | 248/27.3 |
| 8,584,999 | B2 | * | 11/2013 | Liu et al. | 248/222.12 |
| 8,755,178 | B2 | * | 6/2014  | Zheng et al. | 361/679.37 |
| 8,817,460 | B2 | * | 8/2014  | Yu et al. | 361/679.33 |
| 2003/0198012 | A1 | * | 10/2003 | Lin et al. | 361/685 |
| 2007/0211422 | A1 | * | 9/2007  | Liu et al. | 361/685 |
| 2009/0059507 | A1 | * | 3/2009  | Peng et al. | 361/685 |
| 2009/0101781 | A1 | * | 4/2009  | Peng et al. | 248/316.1 |
| 2013/0048813 | A1 | * | 2/2013  | Liu et al. | 248/222.11 |
| 2013/0083459 | A1 | * | 4/2013  | Chen et al. | 361/679.01 |

(Continued)

*Primary Examiner* — Nkeisha Smith (74) *Attorney, Agent, or Firm* — Li & Cai Intellectual Property (USA) Office (57) ABSTRACT

The instant disclosure discloses a fixing structure of a data access device having a fixing tray and a handle. The fixing tray includes at least one fixing latch and at least one elastic member. One end of the fixing tray is a pivot and two hooks. The distance between the fixing latch and the pivot is shorter than that between the elastic member and the pivot. The other end of the fixing tray is an inserting section. One end of the handle is a hinge section, from which two cams are extended. The other end of the handle is an operational pull. The hinge section and the operational pull are connected by a connecting rod. The hinge section pivotally connects to the pivot. A fixing case with the fixing structure of a data access device is disclosed.

9 Claims, 8 Drawing Sheets

(56) References Cited

U.S. PATENT DOCUMENTS

| | | | |
|---|---|---|---|
| 2013/0092807 A1* | 4/2013 | Chen et al. | 248/220.21 |
| 2013/0099640 A1* | 4/2013 | Hu et al. | 312/223.2 |
| 2013/0314868 A1* | 11/2013 | Tsai et al. | 361/679.33 |
| 2014/0211401 A1* | 7/2014 | Lee et al. | 361/679.31 |

* cited by examiner

FIXING STRUCTURE OF DATA ACCESS DEVICE AND FIXING CASE

BACKGROUND OF THE INVENTION

1. Field of the Invention

The present invention relates to a fixing structure of a data access device and a fixing case; in particular, to a fixing structure of a data access device and a fixing case through which the data access device is conveniently and rapidly assembled and disassembled.

2. Description of Related Art

Current computers and servers are equipped with hard drives and disc drives used for saving and reading data. The typical hard drives and disc drives assembled on computer cases are mostly fixed by screws or other fixing devices. Screw fixtures create a significant amount of disadvantages. For example, additional tools are required to lock the screws, and multiple screws are needed on the accommodating case to fix the drive. This results in time consuming operational complications for the users. Moreover, small-sized screws are easily lost.

Using other supplemental fixing devices such as hot swapping devices involve disposing a rotating handle in front of the hard drive and connecting a hard drive fixing frame. The rotating handle and the hard drive fixing frame must be a non-separated device. However, given that hot swapping devices are highly complicated, and that the rotating handles are installed on single sides of the hard drives, the single-sided handling leads to uneven distribution of force and results in unsuccessful removals of the hard drives. Additionally, assembly and disassembly of the hot swapping devices require significant time, and damages thereof are very hard to repair. Therefore, a fixing device that is designed to be easy to assemble and disassemble can greatly increase the convenience of operation.

SUMMARY OF THE INVENTION

The objective of the present invention is to solve the problem of inconvenient assembly and disassembly of the conventional supplemental fixing device. The instant disclosure applies the law of lever and design of cams to easily assemble and disassemble devices, not only saving time and effort but also eschewing supplemental tools, greatly increasing product efficacy.

The instant disclosure relates a fixing structure of a data access device, including a fixing tray and a handle. The fixing tray includes at least one fixing latch and at least one elastic member. When the fixing tray includes one fixing latch and one elastic member, the distance between the fixing latch and the pivot is shorter than that between the elastic member and the pivot. When the fixing tray includes two fixing latches and one elastic member, the elastic member is disposed between the two fixing latches. When the fixing tray includes two fixing latches and two elastic members, the two elastic members are disposed between the two fixing latches. One end of the fixing tray has a pivot and two hooks. The other end of the fixing tray has an inserting section. One end of the handle has a hinge section. Two cams are extended from the hinge section. The other end of the handle has an operational pull. The hinge section and the operational pull are connected by a connecting rod. The hinge section pivotally connects to the pivot. The handle pivotally connects to the fixing tray.

The instant disclosure also relates to a fixing case, used for fixing a data access device. Multiple positioning holes are on the lateral sides of the data access device. The fixing case includes two lateral plates connected by a top plate and a bottom plate, and two of the above-mentioned fixing structure of a data access device. Each of the two lateral plates has at least one sliding groove and at least one locking groove. The two fixing structure of a data access device sandwich the two lateral faces of the data access device and are installed in the two sliding grooves in a removable way.

In order to further the understanding regarding the present invention, the following embodiments are provided along with illustrations to facilitate the disclosure of the present invention. However, the present invention is not limited thereto.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
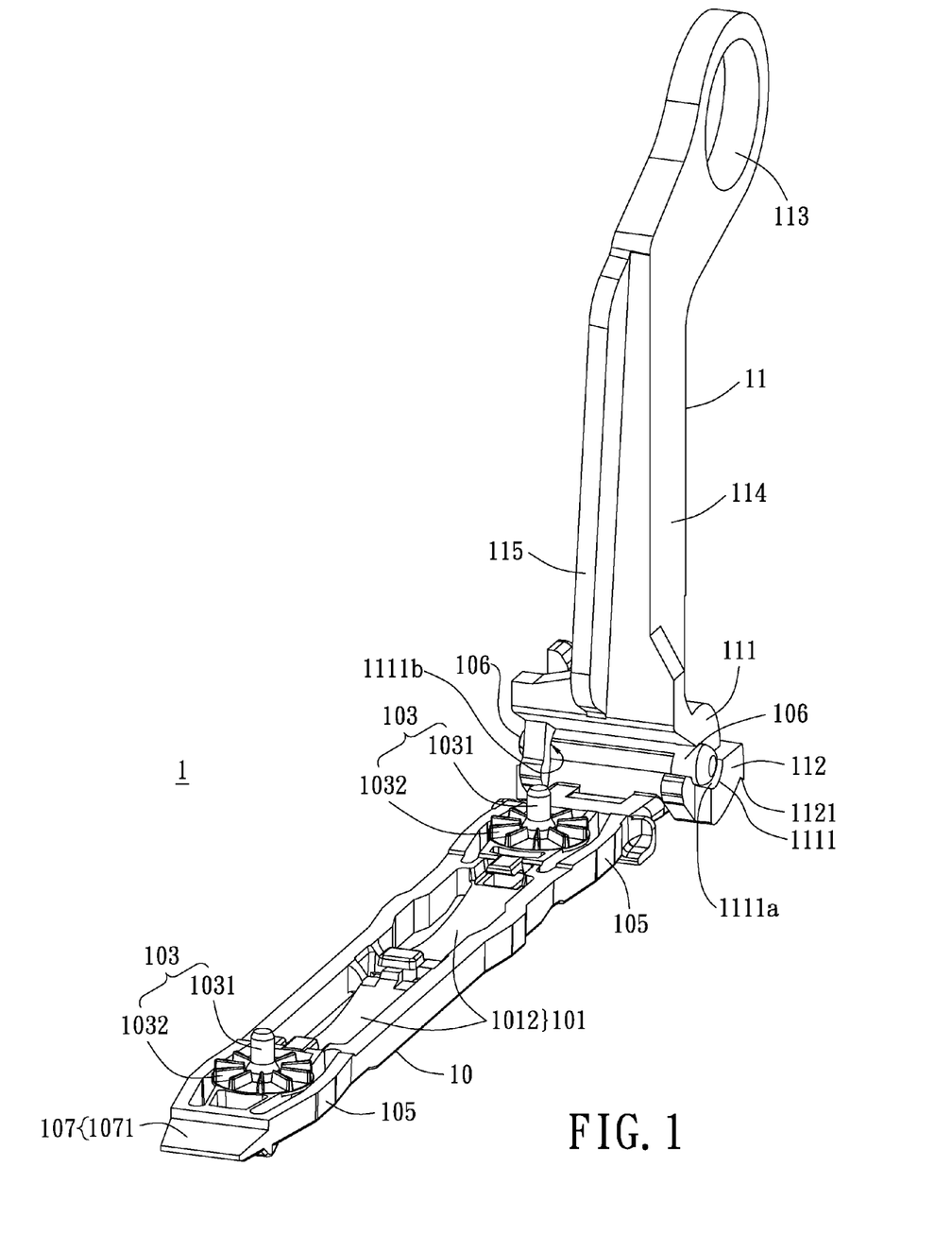
FIG. 1 is a perspective schematic diagram of a fixing structure of a data access device of the instant disclosure.
Figure 2:
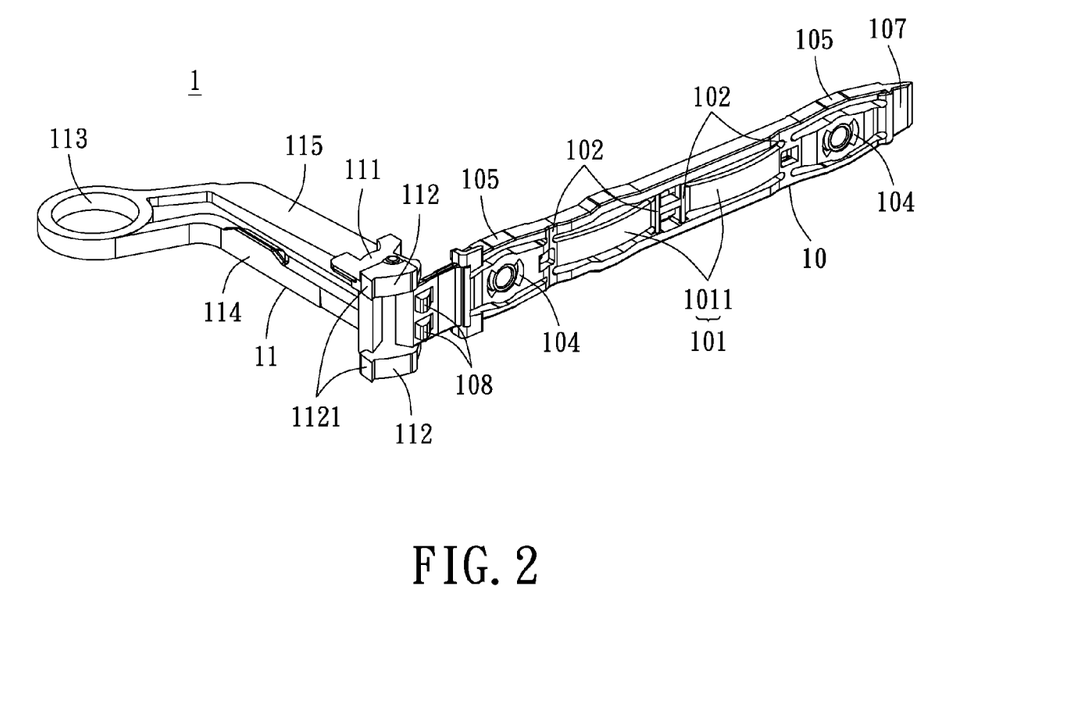
FIG. 2 is a perspective schematic diagram of the fixing structure of a data access device of the instant disclosure from another angle of view.

Please refer to FIG. 1 and FIG. 2. FIG. 1 is a perspective schematic diagram of a fixing structure of a data access device of the instant disclosure. FIG. 2 is a perspective schematic diagram of the fixing structure of a data access device of the instant disclosure from another angle of view. The fixing structure 1 of the data access device of the instant disclosure includes a fixing tray 10 and a handle 11.

First, the fixing tray 10 of the instant embodiment includes two fixing latches 103 and two elastic members 101. The two elastic members 101 are disposed between the two fixing latches 103. However, the fixing tray 10 can alternatively have two fixing latches 103 and one elastic member 101 disposed therebetween. In the instant disclosure, the fixing tray 10 includes at least one fixing latch 103 and at least one elastic member 101, wherein the distance between the fixing latch 103 and a pivot 106 of the fixing tray 10 is shorter than that between the elastic member 101 and the pivot 106. In the instant embodiment, two latching holes 104 are respectively disposed on the fixing tray 10 at locations corresponding to positioning holes 21 of a data access device 2 shown in FIG. 4 and FIG. 5 described later. The two fixing latches 103 are respectively installed in the two latching holes 104 of the fixing tray 10 and are used as fixing members. However, the number of latching holes 104 and fixing latches 103 can be one or more, wherein their numbers and locations are not limited. Generally speaking, the two fixing latches 103 correspond to the positioning holes 21 on the data access device 2 shown in FIG. 4 and FIG. 5, to allow the fixing latches 103 to respectively be inserted in the positioning holes 21 of the data access device 2, thereby fixing the data access device 2 in place.

Figure 6:
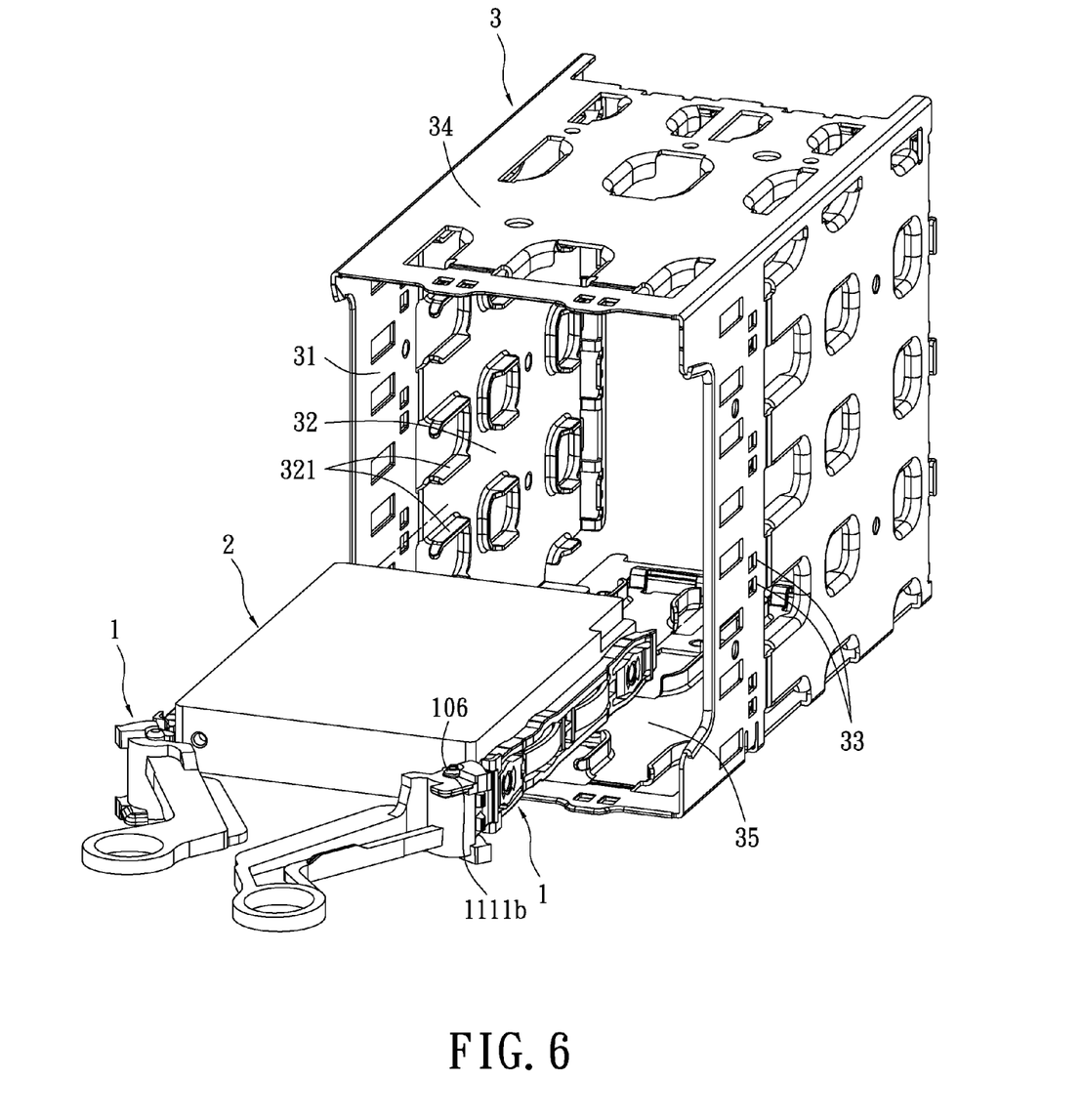
FIG. 6 is a perspective schematic diagram of the data access device of the instant disclosure prior to be assembled to a fixing case.

Two elastic members 101 are disposed between the two fixing latches 103. The connection of the two elastic members 101 is shown in FIG. 2. Two connecting parts 102 are disposed on the fixing tray 10 near the two fixing latches 103, and one connecting part is disposed between the two elastic members 101. The connecting parts 102 are fixedly attached on the fixing tray 10 such that the two elastic members 101 can be fixed on the fixing tray 10. Therefore, each elastic member 101 is fixed onto the fixing tray 10 by having one connecting part 102 disposed at each of its two ends. Moreover, the connecting part 102 between the two elastic members 101 can be shared. Therefore, the number of elastic members 101 can be one or more. The elastic members 101 have curvatures relative to the fixing tray 10 (as shown in FIG. 2 and FIG. 6). The portion of the elastic member 101 facing the front side (namely the side facing the data access device) of the fixing tray 10 is a concavely curved face 1012. The portion of the elastic members 101 facing the back side of the fixing tray 10 are convexly curved faces 1011. Overall, the elastic members 101 are disposed on the fixing tray 10 in a protruding way. Furthermore, protruding parts 105 are respectively disposed on two sides of the fixing tray 10. The protruding parts 105 curve outwards respectively from the two sides of the fixing tray 10 to form a protruding shape and to correspond to the below-mentioned supporting members 321 of a fixing case 3 as shown in FIG. 6. By means of engaging the supporting members 321 with the protruding parts 105, the fixing tray 10 can be fixed inside the below-mentioned sliding groove 32 of the fixing case 3 as shown in FIG. 6.

Figure 4:
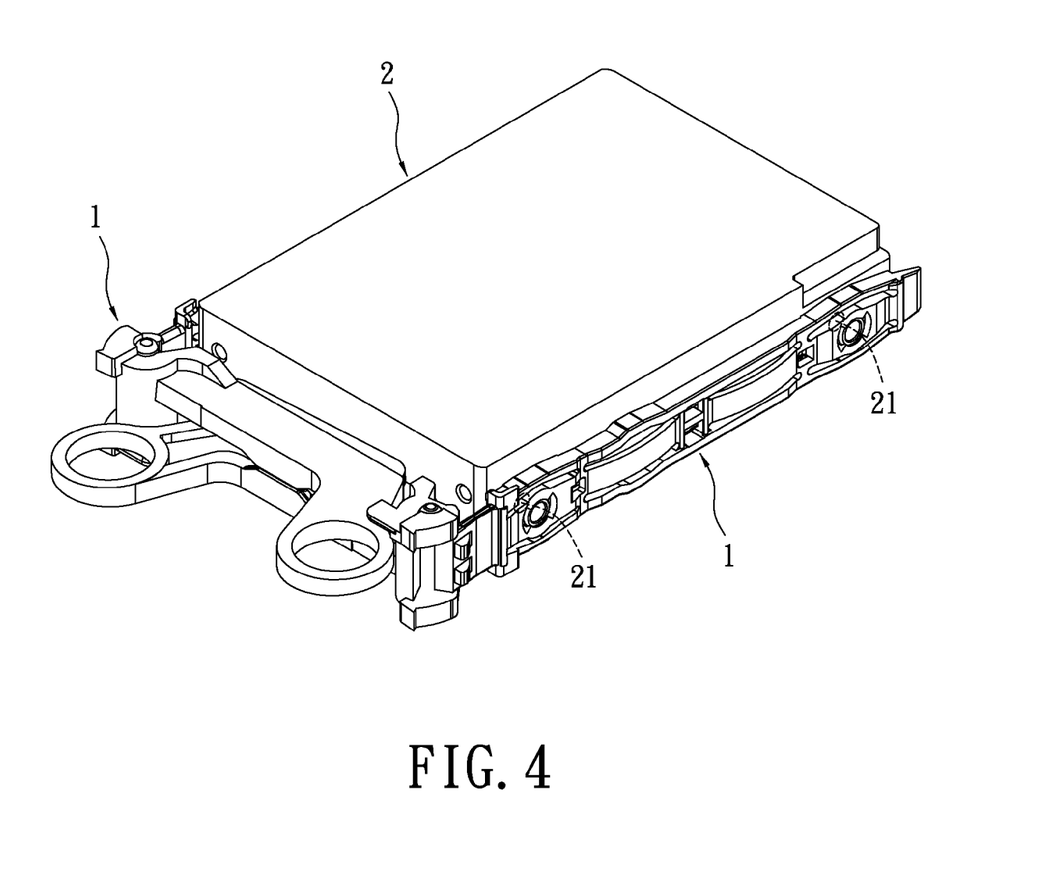
FIG. 4 is an assembly schematic diagram of the fixing structure of a data access device assembled with the data access device.

One end of the fixing tray 10 has one pivot 106 and two hooks 108. The other end of the fixing tray 10 has an inserting section 107. More specifically, the fixing tray 10 pivotally connects to one end of the handle 11. The pivot 106 is disposed on the front side of the fixing tray 10. The two hooks 108 are disposed on the back side of the fixing tray 10. The pivot 106 is disposed on one end of the fixing tray 10 which has an upward extending portion (here "upward" refers to towards the front side of the fixing tray 10). The pivot 106 and the fixing tray 10 form roughly 90 degrees therebetween. The pivot 106 has a rod-like shape. The hooks 108 protrude from the back side of the fixing tray 10. In the instant embodiment, the hooks 108 are triangular, and the amount of the hooks 108 in this embodiment is two. However, the shape and number of the hooks 108 are not limited thereto. The inserting section 107 at the other end of the fixing tray 10 has a slanted guiding face 1071 disposed on the front side of the fixing tray 10 (as shown in FIG. 4).

The end on the handle 11 pivotally connecting to the fixing tray 10 has a hinge section 111. The hinge section 111 has two hinge holes 1111. The two hinge holes 1111 are respectively a close ended hinge hole 1111*b* and a semi-open ended hinge hole 1111*a*, to allow the two ends of the pivot 106 of the fixing tray 10 to respectively pivot with the two hinge holes 1111. In other words, the handle 11 is pivoted on the pivot 106 of the fixing tray 10 by the hinge section 111, thereby allowing the handle 11 to rotate about the fixing tray 10. The two hinge holes 1111 are designed to be respectively the close ended hinge hole 1111*b* and the semi-open ended hinge hole 1111*a* such that when the pivot 106 is to be assembled onto the hinge section 111, one end of the pivot 106 can be first inserted into the close ended hinge hole 1111*b*, and the other end of the pivot 106 can be pressed into the semi-open ended hinge hole 1111*a*, thereby pivotally connecting the pivot 106 with the hinge section 111 in a simplified process.

Furthermore, each cam 112 extends from each of the two sides of the hinge section 111. In the instant embodiment, the cams 112 are curved and have barbs 1121. The cams 112 have the function of pressing against other parts. Furthermore, an operating pull 113 is disposed on the other end of the handle 11. In the instant embodiment, the operating pull 113 can be ring-shaped so as to facilitate the user's inserting his finger into the same to push or pull the handle 11. The operating pull 113 can be of any form convenient for operation, and not limited to the form disclosed herein. In addition, the hinge section 111 and the operating pull 113 are connected by a connecting rod 114. An abutting part 115 extends from the connecting rod 114 toward the front side of the fixing tray 10.

Figure 3:
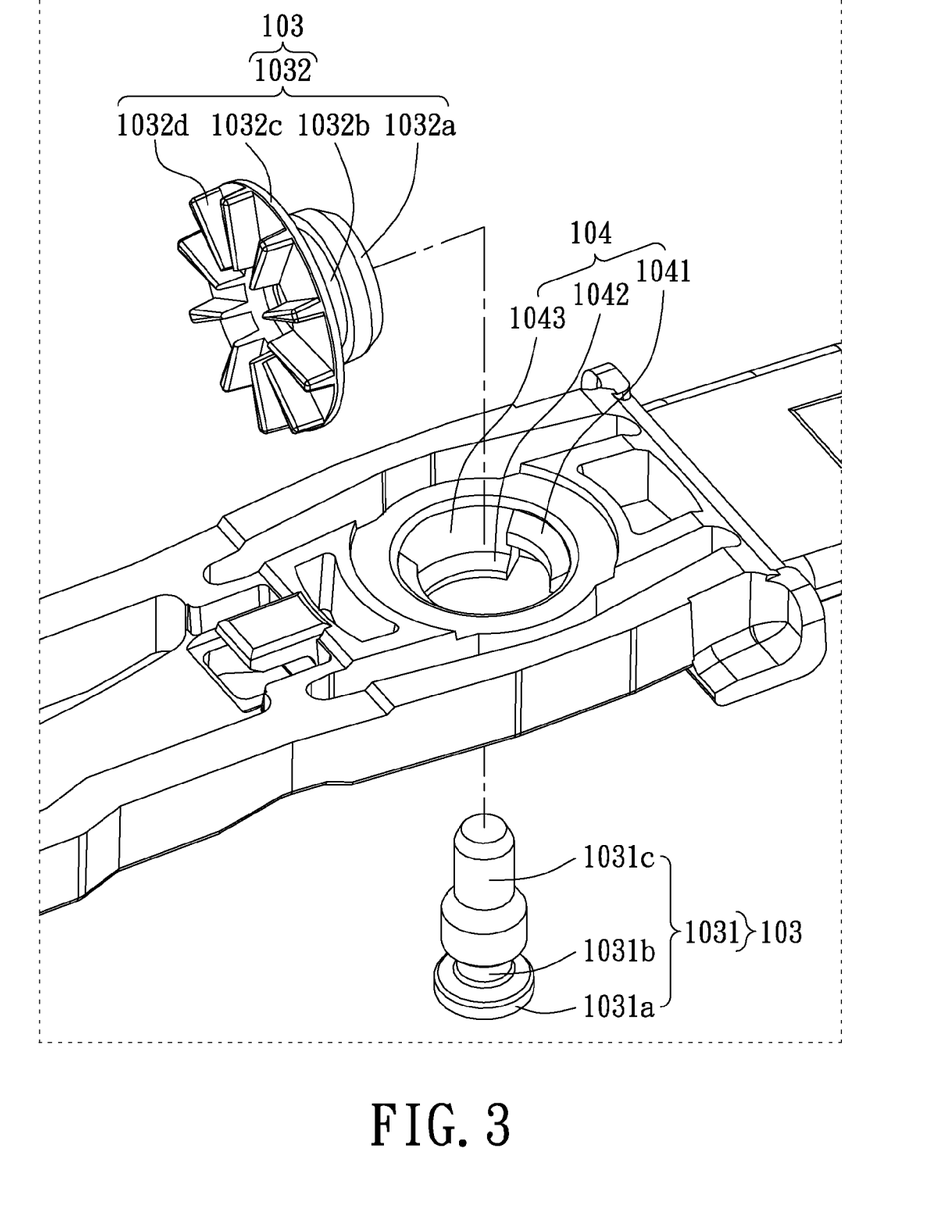
FIG. 3 is an exploded schematic diagram of a fixing latch of the fixing structure of a data access device of the instant disclosure.

FIG. 3 is an exploded schematic diagram of the fixing latch 103 of the fixing structure 1 of a data access device of the instant disclosure. The fixing latch 103 has an interior latch 1031 and an elastic cover 1032. The outside of the interior latch 1031 is partially sleeved with the elastic cover 1032. The interior latch 1031 is preferably made of a metal material to increase its overall rigidity. The elastic over 1032 is preferably made of an elastic material, such as plastic or rubber, in order to absorb vibration, increase friction and improve fixing ability. However, the materials of the interior latch 1031 and the elastic cover 1032 are not limited thereto. In the instant disclosure, the fixing latch 103 can also be of one piece, with the entire piece made of hard plastic, or the interior latch 1031 made of hard plastic and the elastic cover 1032 made of soft plastic by the dual material injection technique.

More specifically, the interior latch 1031 has a head 1031*a*, a neck 1031*b*, and a column 1031*c*. The head 1031*a* has a round plate shape. The neck 1031*b* is an indentation of the interior latch 1031. The part of the interior latch 1031 that is exposed outside the elastic cover 1032 is the column 1031*c*, which can be inserted into the positioning hole 21 of the data access device 2 (as shown in the below-mentioned FIG. 5). The elastic cover 1032 has a buffer plate 1032*c*. Multiple protruding pieces 1032*d* are formed on the buffer plate 1032*c*. Protruding pieces 1032*d* serve the purpose of buffering and stabilizing. The middle part of the elastic cover 1032 forms a neck sleeve 1032*b*. The interior side of the neck sleeve 1032*b* engages the neck 1031*b* of the interior latch 1031, thereby tightly fixing the elastic cover 1032 onto the interior latch 1031. The elastic cover 1032 further includes a head cover 1032*a* used for covering the head 1031*a* of the interior latch 1031. The hinge hole 104 of the fixing tray 10 has an upper blocking plate 1041 and a lower blocking plate 1042. An accommodating open groove 1043 is formed between the upper blocking plate 1041 and the lower blocking plate 1042. Therefore, the head 1031*a* and the head cover 1032*a* can be installed inside the accommodating open groove 1043, and the upper blocking plate 1041 can press against the neck sleeve 1032*b* and prevent the head cover 1032*a* from sliding outwards, thereby accomplishing the objective of fixing the latch 103 inside the latching hole 104.

Figure 5:
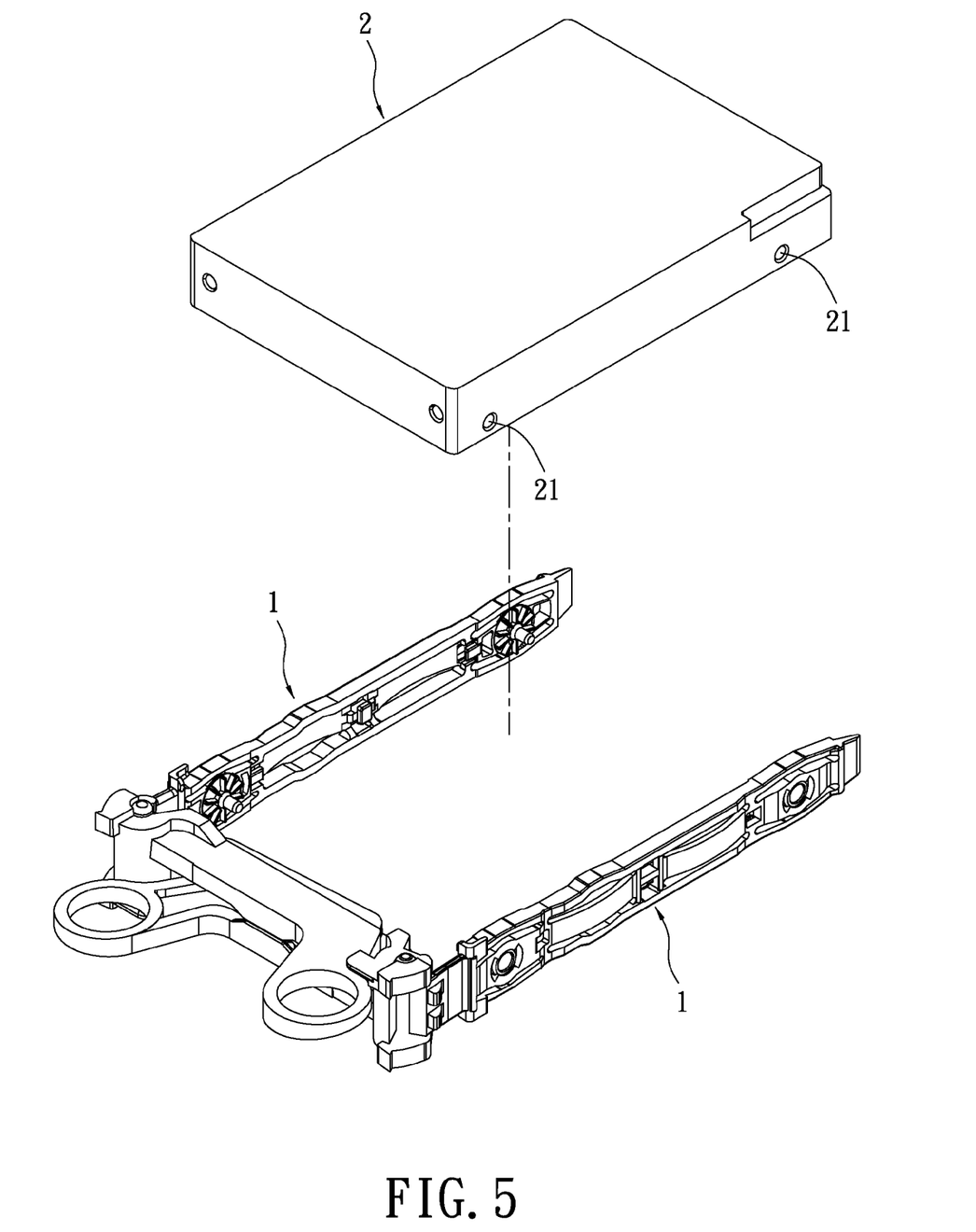
FIG. 5 is an exploded schematic diagram of the fixing structure of a data access device assembled with the data access device.

Please refer to FIG. 3 to FIG. 5. FIG. 4 is an assembly schematic diagram of the fixing structure 1 of a data access device assembled with the data access device 2. FIG. 5 is an exploded schematic diagram of the fixing structure of a data access device assembled with the data access device. The two fixing structures 1 can be respectively assembled onto the two sides of the data access device 2, namely inserting the interior latches 1031 of the fixing latches 103 into the positioning holes 21 of the data access device 2. In this state, the buffer plates 1032c of the elastic covers 1032 are situated between the fixing trays 10 and the data access device 2. The buffering plates 1032c achieve the function of fixing and buffering. In the instant embodiment, the data access device 2 can be a hard drive or a disc drive or other devices used for storing and reading data. However, the type of the data access device 2 is not limited thereto.

Figure 7:
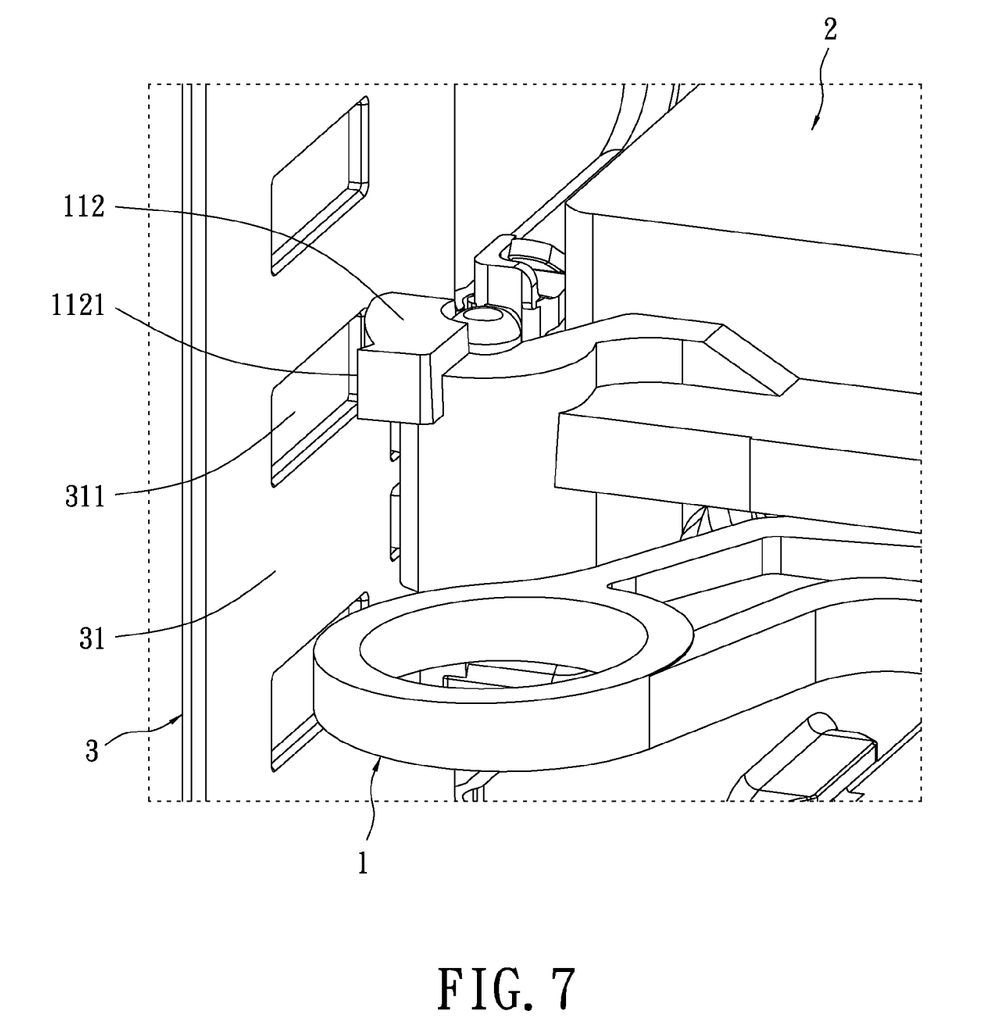
FIG. 7 is a perspective schematic diagram of the fixing structure of a data access device of the instant disclosure fixed inside the fixing case.

Please refer to FIG. 1, FIG. 6 and FIG. 7. FIG. 6 is a perspective schematic diagram of the data access device 2 of the instant disclosure prior to be assembled to the fixing case 3. FIG. 7 is a perspective schematic diagram of the fixing structure 1 of a data access device of the instant disclosure fixed inside the fixing case. The fixing case 3 of the instant disclosure is provided to fix the data access device 2. The fixing case 3 includes two lateral plates 31 and at least two fixing structures 1 of a data access device. The two lateral plates 31 are connected by a top plate 34 and a bottom plate 35. A cover plate (not shown in the figures) can be put on the space formed by the lateral plates 31, the top plate 34 and the bottom plate 35 to form a box-shaped body. The fixing case can be a computer case or a server case. However, the type of the fixing case 3 is not limited thereto.

In the instant embodiment, the fixing structure 1 of a data access device is as described in the above embodiment. Each of the two lateral plates 31 has at least one sliding groove 32 and at least one locking groove 33. The sliding grooves 32 and the locking grooves 33 correspond to each other. The data access device 2 is clamped by sandwiching the two sides of the data access device 2 with the fixing structures 1 of a data access device, and installed into the sliding grooves 32. More specifically, first insert the fixing latches 103 of the fixing structures 1 into the respective positioning holes 21 of the data access device 2, thereby assembling the fixing structures 1 to the data access device 2. Then, slide the fixing trays 10 of the fixing structures 1 into the sliding grooves 32, thereby leaving the fixing structures 1 in a removable or withdrawable state. The slanted guiding face 1071 allows the inserting section 107 to easily slide into the innermost part of the sliding groove 32 (not shown in the figures). At this moment, the hooks 108 of the fixing trays 10 are respectively situated inside the locking grooves 33, thereby fixing the fixing structures 1 in the sliding grooves 32, thereby accomplishing the effect of fixing the data access device 2.

Figure 8A:
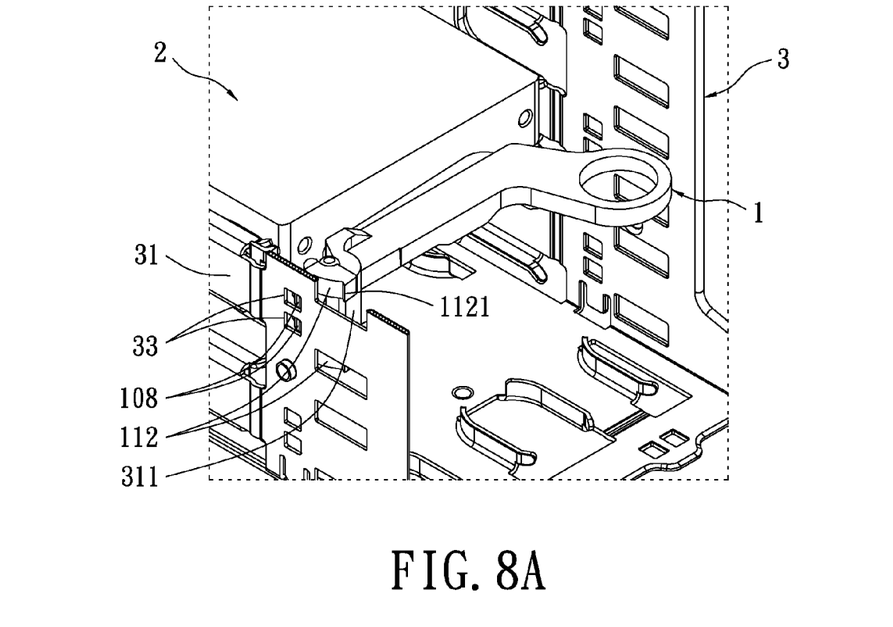
FIG. 8A is a perspective schematic diagram of the fixing structure of a data access device of the instant disclosure prior to flipping the handle.
Figure 8B:
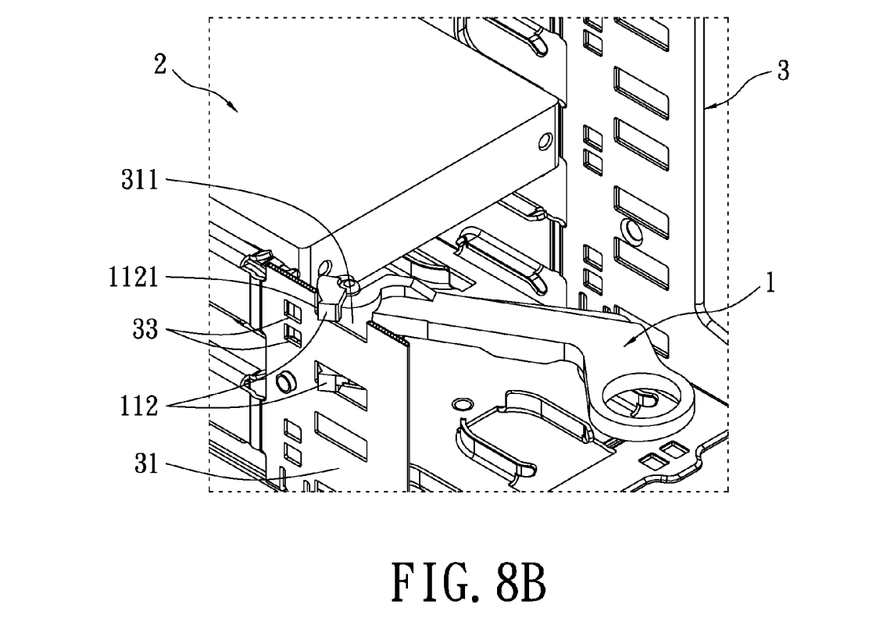
FIG. 8B is a perspective schematic diagram of the fixing structure of a data access device of the instant disclosure after flipping the handle.

Please refer to FIG. 8A and FIG. 8B. FIG. 8A is a perspective schematic diagram of the fixing structure 1 of a data access device of the instant disclosure prior to flipping the handle 11. 8B is a perspective schematic diagram of the fixing structure 1 of a data access device of the instant disclosure after flipping the handle 11. As shown in FIG. 8A, the abutting part 115 of the handle 11 abuts against a face of the data access device 2, the hooks 108 correspond to the respective locking grooves 33. At this moment the hooks 108 of the fixing tray 10 are situated inside the locking grooves 33, to fix the fixing tray 10 in the sliding grooves 32, thereby fixing the data access device 2 inside the fixing case 3. As shown in FIG. 8B, the handle 11 turns pivotally relative to the fixing tray 10 and moves further away from the data access device 2. The cams 112 of the handle 11 press against the interior face of the respective lateral plate 31 of the fixing case 3 due to rotation. When the handle 11 is nearly parallel with the fixing tray 10, the barbs 1121 of the cams 112 act as the fulcrum of the fixing tray 10 by abutting against the edge of an opening 311 of the lateral plate 31 of the fixing case 3, producing the effect of a lever to detach the hooks 108 from the locking grooves 33, driving the fixing tray 10 to be able to be drawn out from the sliding groove 32. The fixing structure 1 of the data access device is removed in the same motion, jointly allowing the data access device 2 to slide away from the fixing case 3, thereby completing the removal of the data access device 2. Moreover, the two hooks 108 of the fixing tray 10 are preferably disposed near where the barbs 1121 of the cams 112 act as fulcrums.

In summary of the above, the instant disclosure has the following advantages:

1. The fixing structure of the data access device of the instant disclosure has the function of insertion, removal and fixture, is easy to operate, and saves considerable time and energy while improving convenience of use.

2. The fixing structure of the data access device of the instant disclosure does not require other supplemental tools to complete installation, can achieve the function of stability and balance through the pairing of fixing structures of the data access device, and is easy to be applied force with.

3. Since the two fixing structures of the data access device are installed respectively on the two sides of the data access device and the parts of the two fixing structure of the data access device are equivalent, the interoperability is high because of lack of need to consider the differences between left and right. Also, the arrangement adapts to any machine type and width.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A fixing case, used for fixing a data access device with at least one positioning hole on its sides, comprising:
    two lateral plates, connected by a top plate and a bottom plate, each of the lateral plates having at least one sliding groove and at least one locking groove disposed thereon; and
    two fixing structures of a data access device, sandwiching the two sides of the data access device and respectively installed in the two of the at least two sliding grooves of the two lateral plates in a removable fashion, wherein each of the fixing structures of a data access device comprises a fixing tray and a handle:
    the fixing tray, having at least one fixing latch and at least one elastic member, wherein the at least one fixing latch is inserted into the corresponding at least one positioning hole of the data access device, one end of the fixing tray has a pivot and at least one hook, the at least one hook corresponds to the at least one locking groove, a distance between one of the at least one fixing latch and the pivot is shorter than that between any of the at least one elastic member and the pivot; and
    the handle, wherein one end of the handle has a hinge section, the hinge section extends to form at least one cam, another end of the handle has an operating pull, the hinge section and the operating pull are connected by a connecting rod, and the hinge section pivotally connects to the fixing tray on the pivot, such that the handle is pivotally connected to the fixing tray.

2. The fixing case according to claim 1, wherein the handles abuts against the data access device, the hooks of the fixing trays are respectively situated inside the locking grooves, thereby respectively fixing the fixing trays in the sliding grooves.

3. The fixing case according to claim 1, wherein when the handles moves further away from the data access device, two barbs on two front edges of the cams respectively act as fulcrums of the fixing trays by pressing against two openings on the lateral plates of the fixing case, thereby enabling the hooks of the fixing trays to respectively detach from the locking grooves and the fixing trays to respectively slide out from the sliding grooves.

4. The fixing case according to claim 3, wherein the hooks of the fixing trays are respectively disposed near where the barbs of the cams acts as the fulcrums of the fixing trays.

5. The fixing case according to claim 1, wherein each of the fixing trays has two fixing latches and one elastic member, the elastic member is disposed between the two fixing latches, and the elastic member has a curvature relative to the corresponding fixing tray such that the elastic member is installed on the corresponding fixing tray in a protruding fashion.

6. The fixing case according to claim 1, wherein each of the fixing trays has two fixing latches and two elastic members, the two elastic members are disposed between the two fixing latches, and the two elastic members have curvatures relative to the corresponding fixing tray such that the elastic members are installed on the corresponding fixing tray in a protruding fashion.

7. The fixing case according to claim 1, wherein each of the fixing trays has at least one latching hole, the at least one fixing latch is disposed in the at least one latching hole, the at least one fixing latch has an interior latch and an elastic cover with which the interior latch is partially sleeved.

8. The fixing case according to claim 1, wherein ends of the fixing trays respectively pivotally connected to the handles have the pivots installed respectively on front sides of the fixing trays and the hooks installed respectively on back sides of the fixing trays.

9. The fixing case according to claim 1, wherein each of the hinge sections has two hinge holes, the two hinge holes are respectively a close ended hinge hole and a semi-open ended hinge hole, and two ends of each of the pivots are respectively pivotally connected inside the corresponding two hinge holes.

\* \* \* \* \*